Figure 1:
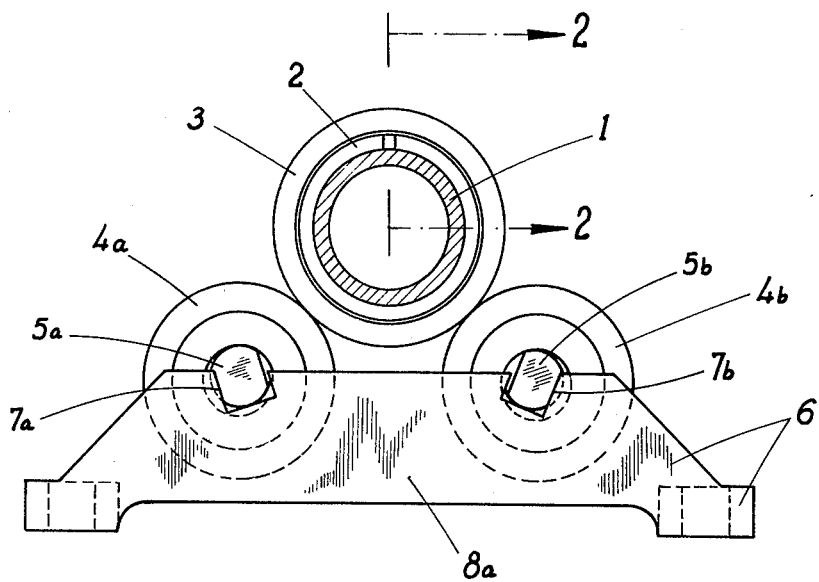

United States Patent [19]

Huppi et al.

[11] 3,958,844

[45] May 25, 1976

[54] BEARINGS FOR RAPPING SHAFT FOR ELECTROSTATIC PRECIPITATORS

[75] Inventors: Xaver Johann Huppi, Zurich; Alfred Frauenfelder, Zollikon, both of Switzerland

[73] Assignee: American Air Filter Company, Inc., Louisville, Ky.

[22] Filed: May 23, 1975

[21] Appl. No.: 580,203

[52] U.S. Cl. .................................. 308/24; 308/36
[51] Int. Cl.² ...................................... F16C 35/02
[58] Field of Search ............ 308/24, 36, 178, 37, 308/64, 92, 93

[56] References Cited
UNITED STATES PATENTS 2,514,152  7/1950  Darash .......................... 308/24
3,724,851  4/1973  Cecchetti ....................... 308/24

*Primary Examiner*—M. H. Wood, Jr.
*Assistant Examiner*—Gene A. Church

[57] ABSTRACT

Bearings for rapping shaft for electrostatic precipitators including two bearings supported by two elongated rod members and a bearing block for receiving the rod support members in nesting relationship thereon, the rapping shaft including a wear ring on the outer periphery thereof, the wear ring being detachably mounted to the shaft and disposed in contacting relationship with the bearings.

6 Claims, 2 Drawing Figures

U.S. Patent May 25, 1976 3,958,844

BEARINGS FOR RAPPING SHAFT FOR ELECTROSTATIC PRECIPITATORS

BACKGROUND OF THE INVENTION

The invention relates to rapping shaft drive means for electrostatic precipitators and more particularly relates to the bearings for a rapping shaft for electrostatic precipitators which are supported by two elongated rod members and a bearing block for receiving the rod members in nesting relationship thereon.

Electrostatic precipitators are provided with discharge and collecting electrodes which attract particulate matter from contaminated air streams passing through the precipitators. Particulate matter or dust which piles up on these electrodes must be removed by shaking or washing of these electrodes. Normally, the shaking is accomplished by vibrators or rapping devices. Generally, such devices have a rotating shaft with tumbling hammers fixed thereto and each of the hammers strikes a rapping rod linked to one or more discharge or collecting electrodes so as to shake or vibrate them. These rotating shafts are supported by bearings which are subjected to wear and tear during the rotation of the rotating shaft with the tumbling hammers affixed thereto.

Wear and tear of the bearings is generally due to the dust content in the gases to be cleaned wherein the dust or particulate matter in the gas streams penetrate into the bearings thereby producing wear and tear of the bearings as well as the shaft. In some operations chemical components in the gas stream attribute to corrosion of the bearings and shafts. And, even further, in other operating environments, the temperature of the gases which are passing through the precipitator, which in some cases are in the neighborhood of 400°C, and higher, adds to the wear and tear of these bearings and shafts. Thus, the atmosphere inside a precipitator together with the wear and tear from dust, as mentioned previously, do not allow for proper lubrication of the bearings.

In present day operations, it is common to use dry slide bearings without lubrication whereby the bearing sleeves and the shaft have to be replaced after the wear and tear has reached a certain level. For example, French Pat. No. 1,361,746 teaches dry bearings with a back rest whereby the supporting parts can be readjusted from time to time. However, wear and tear of the shaft cannot be prevented by this type of bearing. Another French patent, French Pat. No. 1,449,521, teaches a shaft resting on roller or ball bearings on which the inner rings of the bearings are sliding upon two supporting bolts so that when the roller bearing and their supporting bolts are worn they can be replaced. However, this has not completely alleviated the problem. Firstly, dust continues to penetrate into the ball bearings until the ball cage is pushed to one side and finally jammed at the supporting frame of the bearing. Secondly, in conjunction with the penetration of the dust, the outer ring of the ball bearing starts to dig a groove into the rapping shaft which after a while will have to be replaced.

SUMMARY OF THE INVENTION

In the present invention it is recognized that it is desirable to provide a bearing for a rapper shaft of an electrostatic precipitator. Furthermore, it is recognized that it is desirable to provide bearings for a rapping shaft having a substantially long life with a minimum amount of maintenance.

According to the present invention, a rapping shaft having a detachably mounted wear ring thereon turns upon two bearings whereby wear occurs between the bearing and the detachably mounted wear ring and not the rapping shaft.

More particularly, the present invention provides a bearing assembly for a rapping shaft for an electrostatic precipitator comprising two spaced bearings each supported by an elongated rod member mounted in spaced relation in a bearing block, the rapping shaft including a wear ring on the outer periphery thereof, the wear ring being detachably mounted to said shaft and disposed in contacting relationship with the bearings.

It is to be understood that the description of the examples of the present invention given hereinafter are not by way of limitation and various modifications within the scope of the present invention will occur to those skilled in the art upon reading the disclosure set forth hereinafter.

Figure 2:
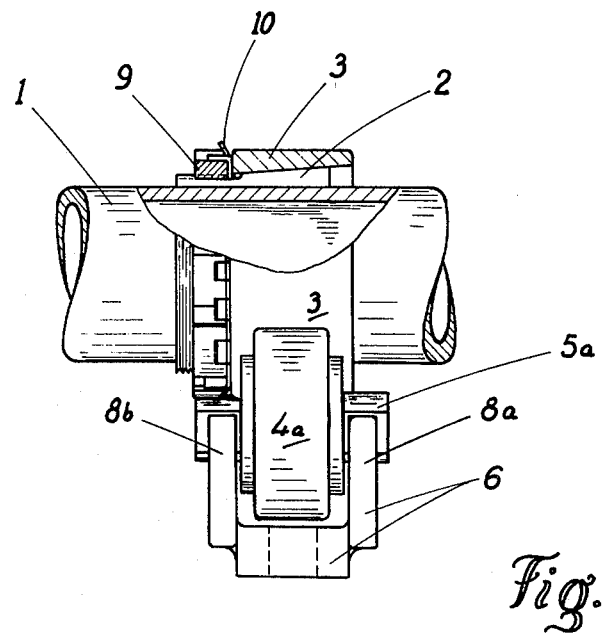

Referring to the drawing:

FIG. 1 is a sectional view illustrating the bearings for a rapping shaft of the present invention; and, FIG. 2 is a side view partially in section taken along line 2—2 of FIG. 1.

In the accompanying drawing, in FIG. 1, upon a shaft 1 a hardened wear ring 3 having a circular outer surface and a tapering inner surface is fastened by means of a split taper element 2, the split taper sleeve 2 being wedged between the outer surface of the shaft 1 and the inner surface of the wear ring 3. The split taper sleeve 2 and hardened wear ring 3 are further held in place by a threaded sleeve 9 and a locking washer 10, threaded sleeve 9 being disposed around the outer periphery of taper sleeve 2 with locking washer 10 being sandwiched between the sleeve 9 and the ring 3.

The shaft 1 is illustrated as being hollow and may be a tube with a relatively thin wall thickness, but, it may also be solid. The hardened ring 3 rests and rolls upon rolls 4a and 4b which are turning on two rod members 5a and 5b, rolls 4a and 4b as well as rod members 5a and 5b being preferably of a hardened material or having their surfaces hardened by any known surface hardening treatment. Rod members 5a and 5b are illustrated as bolts having two flat opposed sides with arcuate sections disposed between the flat sides, the radius of curvature of the arcuate sections being approximately the same as the radius of curvature of the inner periphery of the rollers 4a and 4b.

A bearing block 6 with a U-shaped cradle is provided with a pair of rod member receiving means therein, the rod member receiving means being illustrated as slots 7a and 7b. Each of the vertically extending legs 8 of the U-shaped block 6, only one being shown in FIG. 1, includes two slots 7a and 7b at the upper extremity thereof, slot 7a being on one side of each leg and the slot 7b being on the opposite side of the leg. In a preferred embodiment, it is noted that the slots extend in a downward and inwardly direction and the bolts 5a and 5b rest within said slots. Further, slots 7 are in spaced alignment with opposing slots 7 in the opposed vertically extending leg 8b so that the bolts 5a and 5b are in parallel. Slots 7a and 7b are generally slightly larger than the bolts 5 received thereby so that the bolts 5 may be removed from the block 6 with very little difficulty.

As wear and tear of the bolts 5 and rollers 4 reach an inoperable stage, in order to replace these worn parts of the bearing assembly, the shaft 1 is pushed up and lifted upon the opposite roll. For example, if roll 4b and bolt 5b are to be removed, the shaft 1 is pushed up and lifted upon the opposite roll, roll 4a, wherein the roll 4b together with the bolt 5b are removed from the block 6 with the fingers. Further, if the bolt 5b has been damaged by wear and tear only on one side then the worn side is mechanically re-worked or turned down and the bolt with its roller reset into working position. When wear and tear of both the bolt and roller are beyond re-working, both parts may be replaced by a new pair of bolts and rollers at a minimal cost.

Another advantage of the present invention is that since the rapping shaft is not subject to wear and tear, it is possible to use a tube with a relatively thin wall thickness. Such a tube has the advantage of lighter weight compared to solid shafts and also reduces the friction in the bearings and as a consequence causes less wear and tear on the bearing assembly.

It is realized that other changes may be made to the specific embodiment shown and described without departing from the principals and spirit of the present invention.

What is claimed is:

1. A bearing assembly comprising: two spaced bearings each supported by an elongated rod member mounted in spaced relation in a bearing block, said bearing block including a U-shaped cradle with a pair of rod member receiving means therein, the rod member receiving means including slots in each of the vertically extending legs of the U-shaped cradle, said slots being in spaced alignment, the rapping shaft including a wear ring on the outer periphery thereof, the wear ring being detachably mounted to said shaft and disposed in contacting relationship with said bearings.

2. The bearing assembly of claim 1 wherein the rod members are bolts having two flat opposed sides with arcuate sections disposed between said flat sides, the radius of curvature of said arcuate sections being approximately the same as the radius of curvature of the inner periphery of said bearings.

3. The bearing assembly of claim 1, said slots being disposed at the upper extremity of said vertically extending legs, the slots being on opposite sides of said leg.

4. The bearing assembly of claim 3, said slots extending in a downward and inwardly direction.

5. The bearing assembly of claim 1, said slots being slightly larger than the rod members received thereby whereby said rod members may be removed with very little difficulty.

6. The bearing assembly of claim 1, said wear ring having a circular outer surface and a tapering inner surface, said wear ring being attached to said rapping shaft by a split taper sleeve, said split taper sleeve being wedged between said wear ring and said shaft.

* * * * *